(12) United States Patent
Obata

(10) Patent No.: US 7,773,250 B2
(45) Date of Patent: Aug. 10, 2010

(54) IMAGE FORMING APPARATUS, METHOD AND COMPUTER PROGRAM PRODUCT CAPABLE OF DETECTING A COPY-PROHIBITED MANUSCRIPT

(75) Inventor: Yuriko Obata, Tokyo-to (JP)

(73) Assignee: Ricoh Company Limited, Tokyo (JP)

( * ) Notice: Subject to any disclaimer, the term of this patent is extended or adjusted under 35 U.S.C. 154(b) by 1077 days.

(21) Appl. No.: 11/440,041

(22) Filed: May 25, 2006

(65) Prior Publication Data

US 2006/0291002 A1 Dec. 28, 2006

(30) Foreign Application Priority Data

May 25, 2005 (JP) ............... 2005-153086

(51) Int. Cl.
*G06K 15/00* (2006.01)
*G06F 3/12* (2006.01)

(52) U.S. Cl. ................... 358/1.18; 358/1.14
(58) Field of Classification Search ........... 358/1.1, 358/1.8, 1.9, 1.14, 1.15, 3.26, 3.28; 399/366
See application file for complete search history.

(56) References Cited

U.S. PATENT DOCUMENTS 5,568,268 A * 10/1996 Tsuji et al. ............... 358/296
6,807,388 B1 * 10/2004 Kojima et al. ............ 399/80
2005/0076031 A1 * 4/2005 Xu et al. ................. 707/9
2005/0091372 A1 * 4/2005 Nagao .................... 709/224

FOREIGN PATENT DOCUMENTS

| JP | 08-139920 | 5/1996 |
|---|---|---|
| JP | 10-022203 | 1/1998 |
| JP | 11-112797 | 4/1999 |
| JP | 2000-175031 | 6/2000 |
| JP | 2000-253240 | 9/2000 |
| JP | 2000-253241 | 9/2000 |
| JP | 2000-307851 | 11/2000 |
| JP | 2003-134327 | 5/2003 |
| JP | 2004-102008 | 4/2004 |
| JP | 2004-201068 | 7/2004 |
| JP | 2004-201069 | 7/2004 |
| JP | 2004-227379 | 8/2004 |
| JP | 2004-304772 | 10/2004 |
| JP | 2005-057406 | 3/2005 |
| JP | 2006-246405 | 9/2006 |
| WO | WO/00/51338 | 8/2000 |

* cited by examiner

*Primary Examiner*—Gabriel I Garcia
(74) *Attorney, Agent, or Firm*—Oblon, Spivak, McClelland, Maier & Neustadt, L.L.P.

(57) ABSTRACT

This patent specification describes an image forming apparatus which can effectively check and prevent the unauthorized image processing so that the obtained image data may not be different from the content which a user demands. In one example, an image forming apparatus includes a defining mechanism, a reader, a detector, a comparator, and a notifier. Then, a certain tint block pattern is detected and information of the result is notified effectively.

8 Claims, 16 Drawing Sheets

IMAGE FORMING APPARATUS, METHOD AND COMPUTER PROGRAM PRODUCT CAPABLE OF DETECTING A COPY-PROHIBITED MANUSCRIPT

BACKGROUND OF THE INVENTION

1. Field of the Invention

The present invention relates to an image forming apparatus, a method and a computer program product for capable of detecting a copy-prohibited manuscript and warning about an unauthorized copy.

2. Discussion of the Background

A conventional image forming apparatus has a number of peripheral devices such as an image input device (e.g., a scanner), an image output device (e.g., a printer), and an image storage device. This conventional image forming apparatus is capable of performing several kinds of image data conversion, depending upon user instructions.

Various kinds of standards associated with information security have been studied and established. Image data may often be an item to be protected under such an information security rules. Accordingly, certain measures have been taken against unauthorized access to and copying of image data from, for example, a local storage device which may be installed in a host apparatus such as the background image forming apparatus. Offices may contain a considerable number of confidential documents and may be provided with high security devices for strictly handling confidential documents.

As one example of the above-mentioned high security apparatuses, a secure color image forming apparatus has been recently introduced. This apparatus can handle a special document such as a bill, a stock certificate, and so forth, strictly prohibiting a reproduction of it. At a user attempt to reproduce such document, the apparatus provides a warning to the user that the copying of the document is unauthorized and it may also provides a warning notice to a third person about user's unauthorized copying. Once the color image forming apparatus generates a warning notice to the third person, the warning mode of the apparatus can only be cancelled through a special procedure. Also, a background image processing unit has been introduced. This apparatus is designed to prevent reproduction of copy-prohibited image data without sacrificing versatile page editing features.

Another conventional image printing system has been developed and widely used in the issuance and verification of securities such as stock certificates. In issuance, for example, this system performs the printing on a surface of securities based on information associated with a printing with black toner and transparent fluorescent color toner item by item to be printed on the surface of securities. In this system, the information about black toner and transparent fluorescent color toner is memorized. Thus, an inexpensive printing system has been achieved for printing a high-level security document such as securities. In addition, a securities managing system has been proposed, which prints an issuance number of the securities onto a surface of the securities in an illegible manner and acquires an image of the surface to use to verify identification of securities withdrawn at a later time.

Moreover, unlike special manuscripts such as a bill or securities, confidential documents handled in offices, for example, have various kinds of marks indicating a copying prohibition. Another conventional image forming apparatus can handle these documents and change access levels for copying, transferring, and storing according to confidentiality levels defined by the mark.

SUMMARY OF THE INVENTION

A novel image forming apparatus, method and computer program product for effectively checking and preventing unauthorized image processing. In one example, a novel image forming apparatus includes a defining mechanism, a reader, a detector, a comparator, and a notifier. The defining mechanism is configured to set an identifier according to a certain tint block pattern. The reader is configured to read image data according to an original of image. The detector is configured to detect the certain tint block pattern in the image data read by the reader. The comparator is configured to compare the detected tint block pattern with the certain tint block pattern. The notifier is configured to provide information as a result of the comparison performed by the comparator in accordance with the identifier.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
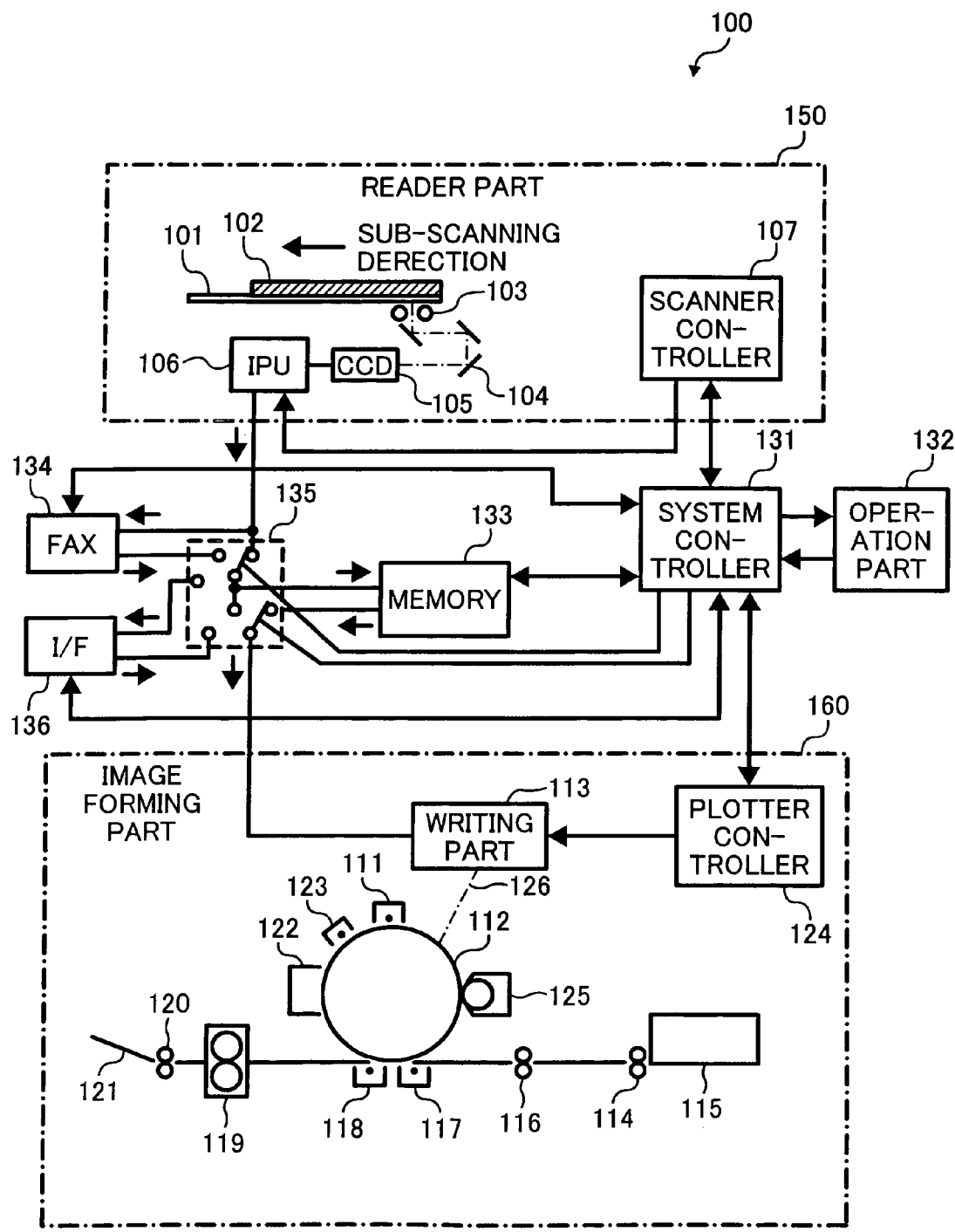
FIG. 1 is an illustration illustrating an example system configuration of a digital copying apparatus according to an example embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a system configuration of a digital copying apparatus 100 according to an example embodiment of the present invention is described.

As illustrated in FIG. 1, the digital copying apparatus 100 includes a reader part 150, an image forming part 160, an operation part 132, a system controller part 131, a memory part 133, a facsimile part 134, an interface part 136, and a selector part 135.

The reader part 150 includes a manuscript table 101, an exposure lump 103, a reflecting mirror 104, an image sensor (CCD) 105, an image processing unit (IPU) 106, and a scanner controller 107. The image forming part 160 includes an electrostatic charger 111, a photoconductor 112, a writing part 113, paper feeding rollers 114, a paper feeding tray 115, resist rollers 116, a transferring charger 117, a separating charger 118, a fixing unit 119, paper ejecting rollers 120, a paper ejecting tray 121, a cleaning unit 122, a removing electricity charger 123, a plotter controller 124, and a developing unit 125.

Figure 2:
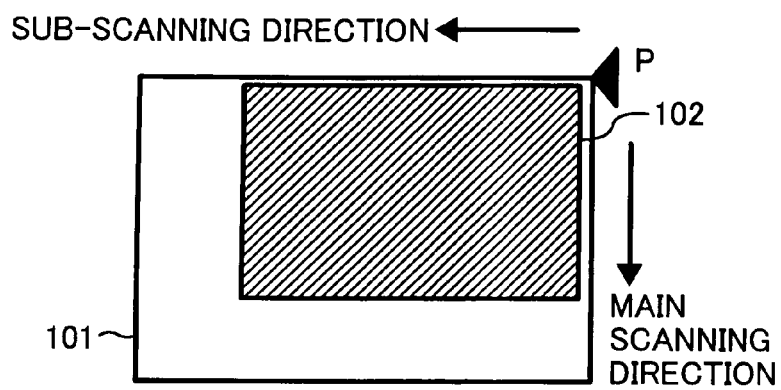
FIG. 2 is an illustration of an upper side of a manuscript table included in the digital copying apparatus of FIG. 1.

In the reader part 150, an original manuscript 102 is put on the manuscript table 101. The manuscript is set as shown in FIG. 2. FIG. 2 shows a general illustration of upper side of the manuscript table 101. The manuscript table 101 has the length of 12 inches main scanning direction M and the length of 17 inches in sub-scanning direction S.

The scanner controller 107 detects sensors, controls driving motors and set parameters in the IPU 106 so that the reading process to be performed.

The exposure lump 103 moves along the manuscript table 101 to expose the manuscript so that the reflecting light reflects by the reflecting mirror 104, and then, the image sensor (CCD) 105 photoelectrically transfers to electric signal according to the intensity of the light. The image processing unit (IPU) 106 converts the electric signal to 8-bit digital signal with the process of shading correction. After image processing such as zooming or dithering, the signal is input into the image forming part 160 with image synchronizing signal.

In the image forming part 160, the electrostatic charger 111 charges the photoconductor 112 which rotates in a certain speed. The photoconductor 112 is exposed in laser light 126 from the writing part 113. The laser light 126 is modulated by image data.

The developing unit 125 develops the latent image formed on the photoconductor 112 to toner image.

With the thus-structured digital copying apparatus 100, transfer paper is conveyed from the paper feeding tray 115 to the resist rollers 116 by the paper feeding rollers 114. Then, the transfer paper is further conveyed to the photoconductor 112, and the toner on the photoconductor 112 is electrostatically transferred onto the transfer paper by an action of the transferring charger 117. Then, the transfer paper is separated from the photoconductor 112 by an action of the separating charger 118.

After that, the toner on the transfer paper is fixed with heat and pressure onto the transfer paper through the fixing unit 119. The paper ejecting rollers 120 eject the transfer paper with the fixed toner image thereon onto the paper ejecting tray 121.

The toner remaining on the photoconductor 112 after the transferring process is cleaned by the cleaning unit 122 which touches the photoconductor 112 and removes the toner. Remaining electricity on the photoconductor 112 is neutralized by the removing electricity charger 123. The plotter controller 124 detects sensors and controls driving motors so that the image forming process to be performed.

Figure 3:
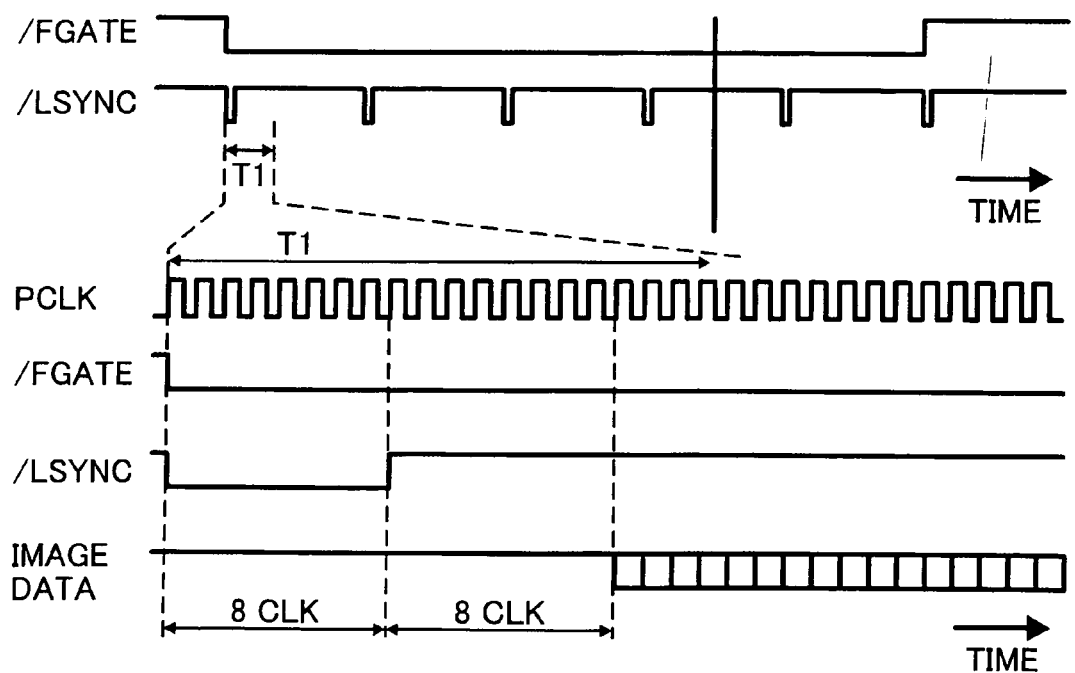
FIG. 3 is a timing chart of image synchronizing signals output from an IPU in a reader part of the digital copying apparatus illustrated in FIG. 1.

FIG. 3 shows a timing chart of image synchronizing signals output from the IPU 106 in the reader part 150 of the example embodiment of the present invention. In FIG. 3, a timing chart has horizontal direction as time and vertical direction as each type of signals. A period T1 of upper two signals is enlarged shown as T1 below.

The /FGATE is a signal of image effective area in the sub scanning direction. When this signal is low, the image is effective. The /FGATE is asserted or negated on the trailing edge of a line synchronizing signal (/LSYNC). The /LSYNC signal is asserted on the leading edge of a pixel synchronizing signal (PCLK) by a certain clock number. After rising of the /LSYNC signal and after a certain clock number of PCLK, the image data in the main scanning direction become effective.

The number of sent image data is one to one cycle of PCLK. The image data starts from the point P shown in FIG. 2 and has a resolution of 400 DPI. The image data is output as raster type data. The size of transfer paper defines effective area of image data in the sub-scanning direction.

In FIG. 1, the system controller part 131 detects the input state of the operation part 132 input by an operator. The system controller part 131 also sets various parameters and directs process execution to the reader part 150, the memory part 133, the image forming part 160, the facsimile part 134, and the interface part 136 by communication. The state of the whole system is displayed on the operation part 132. The directions to the system controller part 131 are performed through the operation part 132 input by an operator.

With the directions from the system controller part 131, the facsimile part 134 compresses the sent image data with the method of G3 or G4 facsimile regulations and outputs to telephone line. Meanwhile, input data in the facsimile part 134 from telephone line is decompressed to binary image data and sent to the writing part 113 in the image forming part 160 to be formed image. With the directions from the system controller part 131, the interface part 136 outputs the data in the memory part 133 to an external storage device (not shown) or inputs the data from outside to the memory part 133.

With the directions from the system controller part 131, the selector part 135 changes the state of the selector and selects one of the original data for image forming from the reader part 150, the memory part 133, and the facsimile part 134. The memory part 133 generally memorizes the image data of the manuscript 102 from the IPU 106, and the stored data is used for copy applications such as repeat copy, rotation copy, etc. The memory part 133 is also used as a buffer memory of the binary image data from the facsimile part 134.

Figure 4:
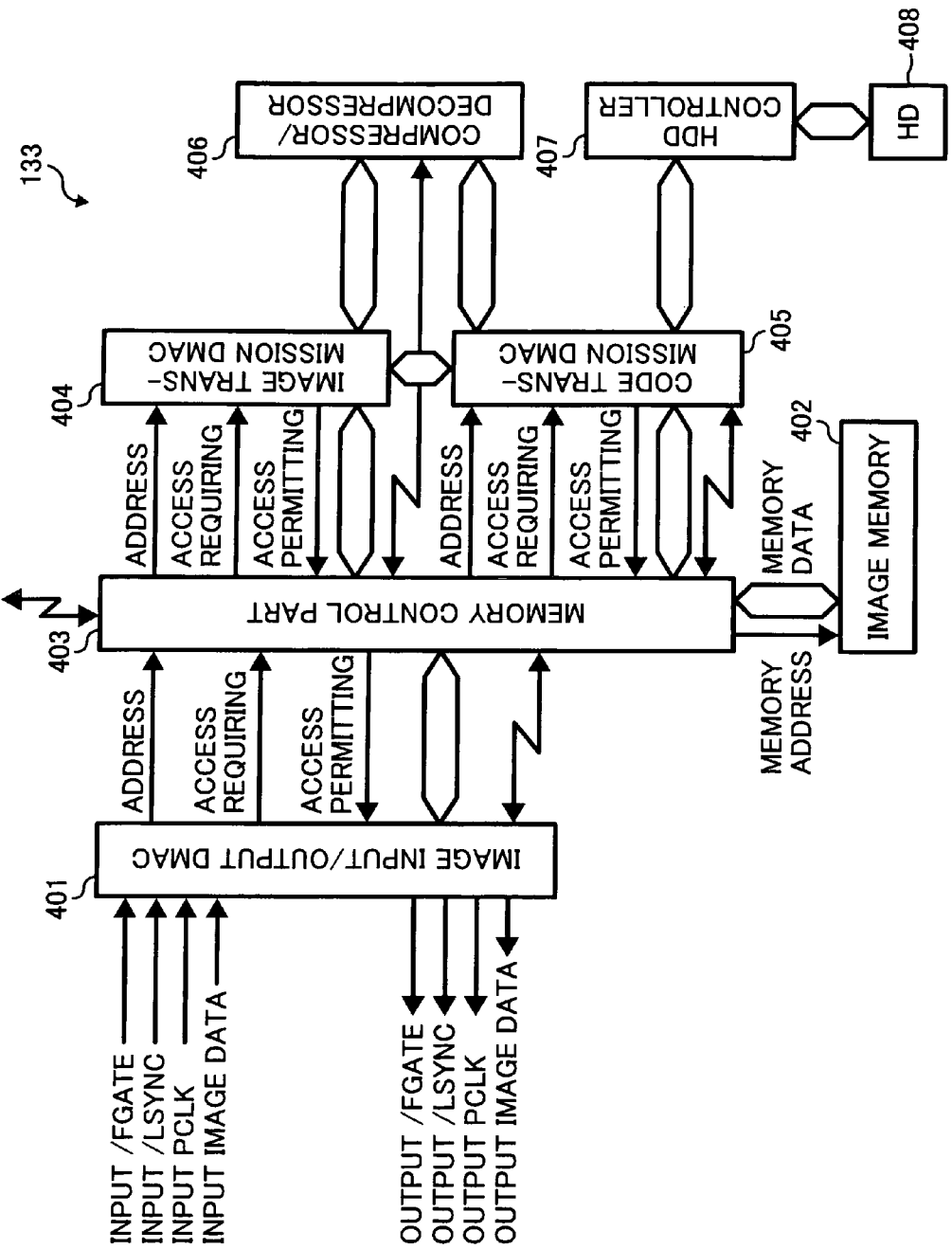
FIG. 4 is a block diagram of an example configuration of a memory part of the digital copying apparatus illustrated in FIG. 1.

FIG. 4 shows a block diagram of a configuration of the memory part 133 of the example embodiment of the present invention. The memory part 133 includes a direct memory access controller (DMAC) for image input/output 401, an image memory 402, a memory control part 403, a DMAC for image transmission 404, a DMAC for code transmission 405, a compressor/decompressor 406, a controller of a hard disk drive (HDD) 407, and a hard disk (HD) 408.

The DMAC 401 includes CPU and logic circuit (not shown). The DMAC 401 communicates with the memory control part 403, receives a command, sets operation directions according to the command. And for notifying the state of the DMAC 401, the DMAC 401 outputs the status information. When the DMAC 401 receives a command of image input, the input image data is packed as 8-pixel memory data according to the input image synchronizing signal. The packed memory data is output to the memory control part 403 with a memory access signal at any time. Meanwhile, when the DMAC 401 receives a command of image output, the image data from the memory control part 403 is output, synchronized with the output image synchronizing signal.

The image memory 402 is a primary memory configured by semiconductor storage cells such as DRAM which memorizes image data. The total memory size 9 MB consists of 4 MB for binary image data which has a size of A3 and has a resolution of 400 DPI, 4 MB for accumulation of electronic sorting, and 1 MB for accumulation of data conversion. Reading and writing of image memory 402 is controlled by the memory control part 403.

The memory control part 403 includes CPU and logic circuit (not shown). The memory control part 403 communicates with the system controller part 131, receives a command, sets operation directions according to the command, and outputs status information of the memory part 133. Operation commands from the system controller part 131 are image input, image output, compression, decompression, etc. The image input and output commands are transmitted to the DMAC for image input/output 401, the commands related to compression are transmitted to the DMAC for image transmission 404, the DMAC for code transmission 405, and the compressor/decompressor 406.

The memory control part 403 is initialized by the image input directions from the system controller part 131, and it waits for image data. The image data is input into the memory part 133 when the scanner operates. First, the input image data is written in semiconductor memory. Then, the number of processing lines of the written image data is calculated by the DMAC 401 for image input/output, and it is input into the memory control part 403. The compressor/decompressor 406 outputs the transmission memory access demand signal in response to the command of image transmission, but the memory access is not performed actually because the demand mask part of the memory control part 403 masks the demand signal. By the input data of one line from an image input/output part being completed, the mask of the transmission memory access demand signal is canceled. Then, the semiconductor memory is read, and the transmission of image data to the compressor/decompressor 406 starts. During this operation, a difference calculator (not shown) calculates a difference between the numbers of processing lines. When a calculation result is 0, the transmission memory access demand signal is masked so as not to pass the address.

The DMAC for image transmission 404 includes a CPU and a logic circuit (not shown). The DMAC for image transmission 404 communicates with the memory control part 403, receives a command, sets operation directions according to the command, and outputs status information of the operations. If the DMAC for image transmission 404 receives a command of compression, the DMAC for image transmission 404 outputs memory access demand signal to the memory control part 403. If memory access enabling signal is active, the DMAC for image transmission 404 receives the image data, and transmits the image data to the compressor/decompressor 406. The DMAC for image transmission 404 includes an address counter (not shown), outputs 22-bit memory address which shows the storing place where image data is stored.

The DMAC for code transmission 405 includes CPU and logic circuit (not shown). The DMAC for code transmission 405 communicates with the memory control part 403, receives a command, sets operation directions according to the command, and outputs status information of the operations. If the DMAC for code transmission 405 receives a command of decompression, the DMAC for code transmission 405 outputs memory access demand signal to the memory control part 403. If memory access enabling signal is active, the DMAC for code transmission 405 receives the image data, and transmits the image data to the compressor/decompressor 406. The DMAC for code transmission 405 includes an address counter (not shown), outputs 22-bit memory address which shows the storing place where image data is stored.

a. The compressor/decompressor 406 includes CPU and logic circuit (not shown). The compressor/decompressor 406 communicates with the memory control part 403, receives a command, sets operation directions according to the command, and outputs status information of the operations. For example, binary image data is processed by a Modified Huffman method (MH).

b. The HDD controller 407 includes CPU and logic circuit (not shown). The HDD controller 407 communicates with the memory control part 403, receives a command, sets operation directions according to the command, and outputs status information of the operations. The HDD controller 407 reads status of the secondary memory storage HD 408, and transmits the data.

As mentioned above, with the directions from the system controller part 131, the memory part 133 reads and writes the image data to the certain image domain of the image memory by using the DMAC for image transmission 404 during image inputting and data accumulation. At this time, DMAC for image transmission 404 counts the number of image lines.

Figure 5:
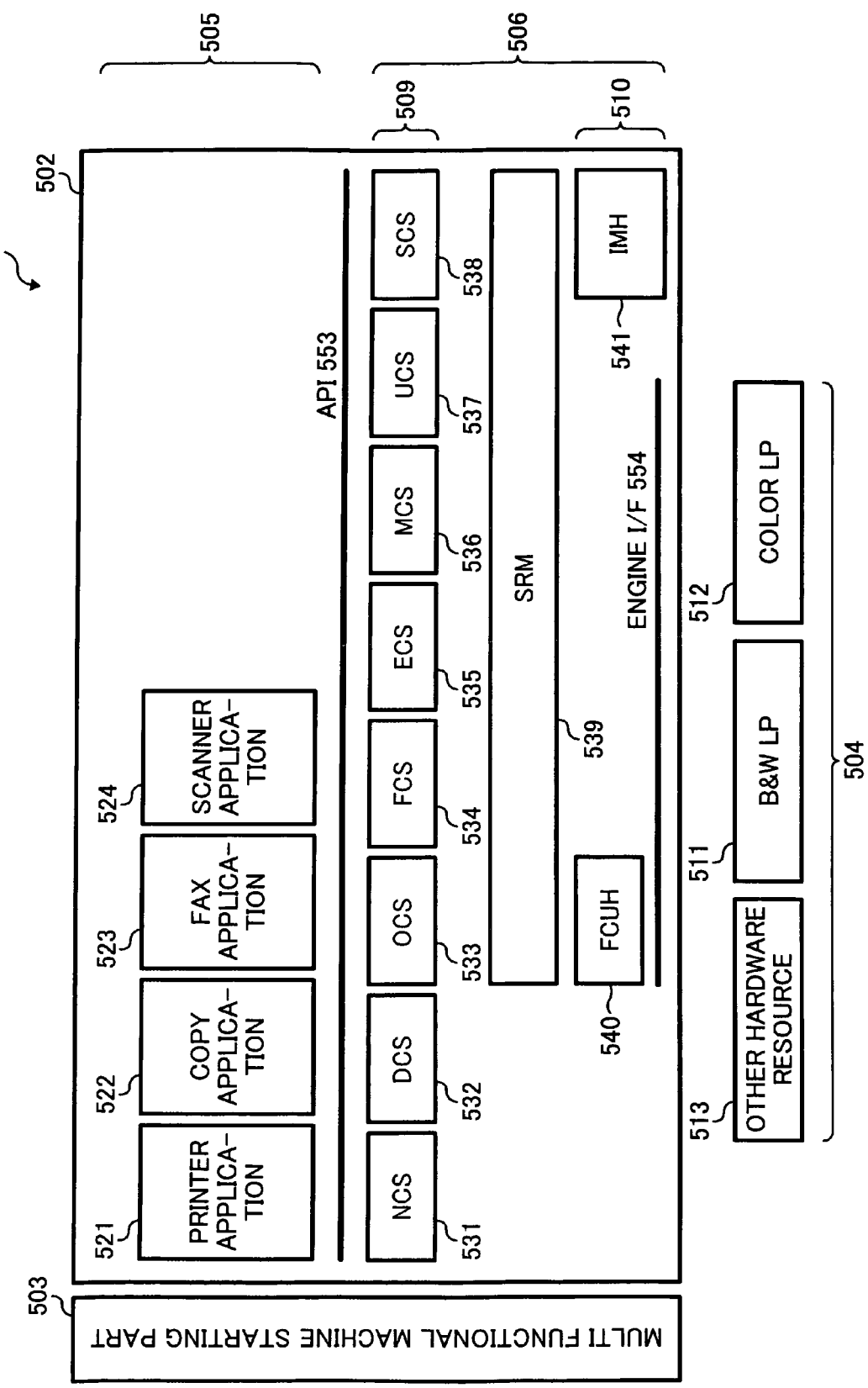
FIG. 5 is an illustration illustrating an example configuration of a multi functional image forming apparatus according to another example embodiment of the present invention.

Next, a multi functional image forming apparatus 501 as another example embodiment of the present invention is described with reference to FIG. 5. FIG. 5 illustrates an example configuration of the multi functional image forming apparatus 501. The multi functional image forming apparatus 501 includes a software group 502, a multi functional machine starting part 503, and hardware resources 504.

When a power of the multi functional image forming apparatus is turned on, first, the multi functional machine starting part 503 is executed. Then, the multi functional machine starting part 503 starts an application layer 505 and a platform 506. For example, the multi functional machine starting part 503 reads programs of the application layer 505 and the platform 506 from the hard disk drive unit (hereinafter HDD), or other memory, corresponding to the memory storage connected outside. Then, the read programs are transmitted to memory domains, such as a system memory (refer to FIG. 6), and starts. The hardware resources 504 include black and white laser printer (B&W LP) 511, a color laser printer (Color LP) 512, and the other hardware resource 513, such as a scanner, a facsimile, etc.

The software group 502 includes the application layer 505 and the platform 506 which are on an OS (operating system), such as UNIX (registered trademark). The application layer 505 includes the program which performs processing peculiar to the user service related to image formation of a printer, a copy, a facsimile, a scanner, etc.

The application layer 505 includes a printer application 521, a copy application 522, a facsimile application 523, and a scanner application 524.

The platform 506 includes the control service layer 509, a system resource manager (SRM) 539, and a handler layer 510. The control service layer 509 interprets the processing demand from the application layer 505, and generates the acquisition demand of the hardware resources 504. The SRM 539 manages one or more hardware resources 504, and arbitrates the acquisition demand from the control service layer 509. The handler layer 510 manages the hardware resources 504 according to the acquisition demand from SRM 539.

The control service layer 509 is configured to include one or more service modules, such as network control service (NCS) 531, delivery control service (DCS) 532, operation panel control service (OCS) 533, facsimile control service (FCS) 534, engine control service (ECS) 535, memory control service (MCS) 536, user information control service (UCS) 537, and system control service (SCS) 538.

The platform 506 is configured to perform through API 553 which receives the processing demand from the application layer 505 according to the previously defined function. The OS parallel executes software of the application layer 505 and the platform 506 as a process.

The process of NCS 531 offers the service used in common to the application which needs network I/O (Input/Output). The process of NCS 531 distributes the data received by each protocol from the network to each application. The process of NCS 531 also intermediates the data from each application to be transmitted to the network.

NCS 531 controls data communications with the network device connected to a network by HyperText Transfer Protocol (HTTP) by HyperText Transfer Protocol Daemon (httpd). The process of DCS 532 controls distribution of an accumulation document etc. The process of OCS 533 controls an operation panel 610 (refer to FIG. 6) used as the means of communication between an operator and this machine.

The process of FCS 534 offers API 553 for performing the facsimile transmission/reception which uses Public Switched Telephone Network (PSTN) or an Integrated Services Digital Network (ISDN) from the application layer 505, registration/quotation of the various facsimile data managed by a local memory for backup (refer to FIG. 6), facsimile reading, facsimile reception printing, etc.

The process of ECS 535 controls engine parts, such as the B&W LP 511, the Color LP 512, and the other hardware resource 513. The process of MCS 536 controls acquisition/opening of memory domains, such as a system memory (refer to FIG. 6), the use of HDD (refer to FIG. 6), etc. UCS 537 manages user information. SCS 538 processes application management data, operation part control data, system screen display data, LED display data, hardware resource control data, interruption application control data, etc.

The process of SRM 539 controls a system and manages the hardware resources 504 with SCS 538. For example, thief there is an acquisition demand from the higher layer using the hardware resources 504, such as the B&W LP 511 and the Color LP 512, the process of SRM 539 arbitrates and performs execution control. The process of SRM 539 judges whether the hardware resources 504 can be used or not (i.e., whether it is used by other acquisition demands). Whether the hardware resources 504 can be used is notified to a higher layer. Moreover, the process of SRM 539 schedules for use the hardware resources 504 to the acquisition demand from a higher layer. And the process of SRM 539 directly carries out, the purport that the hardware resources 504 by which the acquisition demand was carried out the contents of a demand (for example, paper conveyance and image forming by printer engine, memory reservation, file generation, etc.)

The handler layer 510 includes facsimile control unit handler (FCUH) 540 which manages facsimile control unit (FCU) (refer to FIG. 6), and image memory handler (IMH) 541 which assigns memory corresponding to process and manages the memory assigned to the process. SRM 539 and FCUH 540 demand processing to the hardware resources 504 using engine I/F 554 which enables transmission of the processing demand to the hardware resources 504 with a function defined beforehand.

The multi functional image forming apparatus 501 can centrally perform processing which is required in common by each application by using the platform 506.

Figure 6:
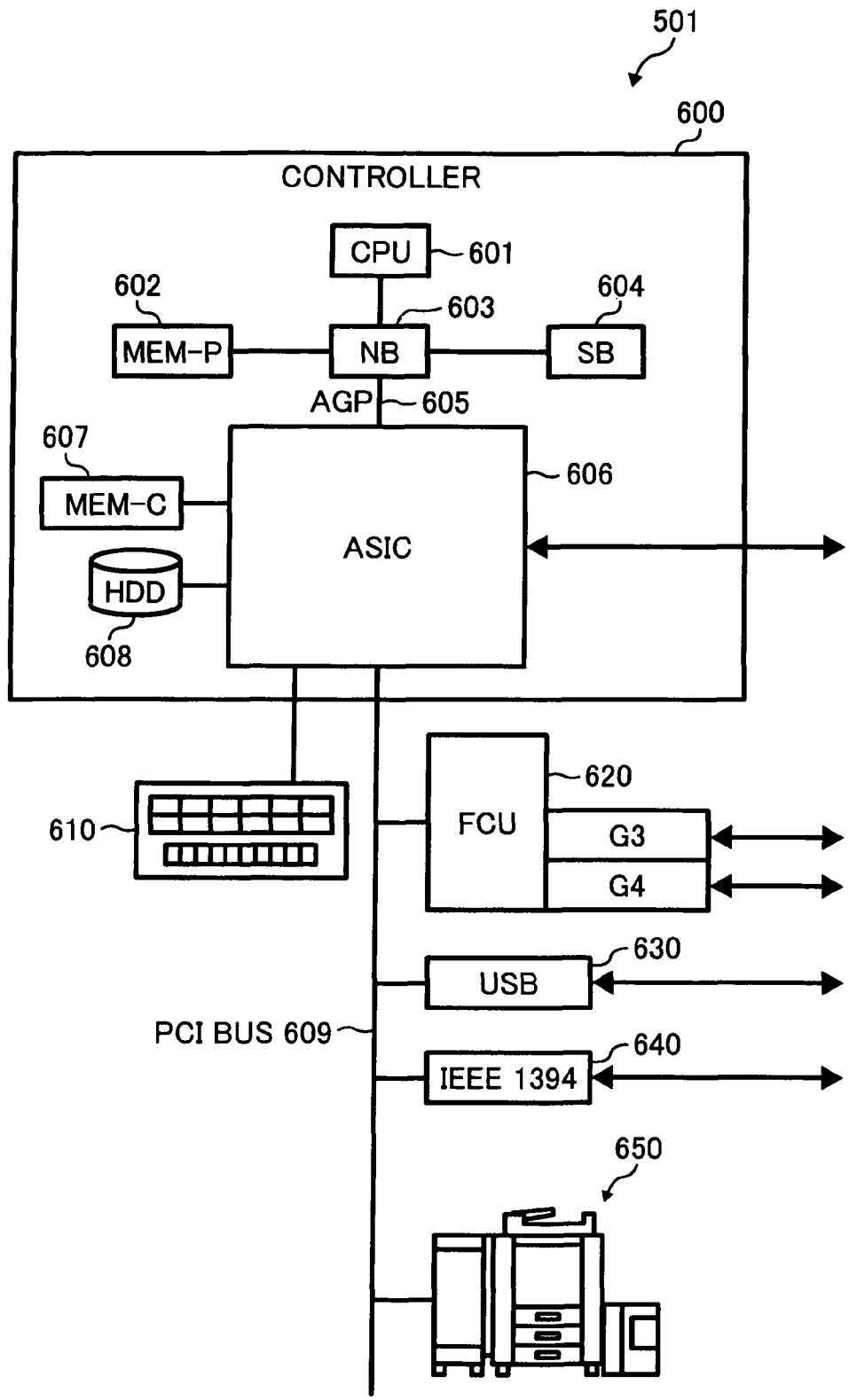
FIG. 6 is an illustration illustrating an example hardware configuration of the multi functional image forming apparatus of FIG. 5.

FIG. 6 shows a configuration of the multi functional image forming apparatus of the example embodiment of the present invention. The multi functional image forming apparatus 501 of the present invention includes a controller 600, an operation panel 610, the FCU 620, a USB (Universal Serial Bus) device 630, an IEEE (Institute of Electrical and Electronic Engineers) 1394 device 640, and an engine part 650.

The controller 600 includes a CPU 601, a system memory (MEM-P) 602, a Northbridge (NB) 603, a Southbridge (SB) 604 and an ASIC 606, a local memory (MEM-C) 607, and the HDD 608. The operation panel 610 is connected to the ASIC 606 of the controller 600. The FCU 620, the USB device 630, the IEEE 1394 device 640, and the engine part 650 are connected to the ASIC 606 of the controller 600 by a PCI bus 609. The FCU 620 is used for connection with a facsimile, and the USB device 630 and the IEEE 1394 device 640 for connection with a scanner, a plotter, etc.

The MEM-C 607, the HDD 608, etc. are connected to the ASIC 606. The CPU 601 and the ASIC 606 are connected through the NB 603 of a CPU chip set. Thus, if the CPU 601 and the ASIC 606 are connected through the NB 603, it can cope with the situation that the interface of CPU 601 is not exhibited.

The ASIC 606 and NB 603 are not connected through the PCI bus 609 but connected through an accelerated graphics port (AGP) 605. Thus, in order to carry out execution control of the one or more processes which form the application layer 505 shown in FIG. 5, the ASIC 606 and NB 603 are not connected through the low speed PCI bus 609 but connected through the AGP 605 so that the fall of performance is prevented.

The CPU 601 controls the multi functional image forming apparatus 501. The CPU 601 starts and executes the NCS 531, DCS 532, OCS 533, FCS 534, ECS 535, MCS 536, UCS 537, SCS 538, SRM 539, FCUH 540, and IMH 541 on the OS. And the CPU 601 also starts and executes the printer application 521, the copy application 522, the facsimile application 523, and the scanner application 524 which form the application layer 505.

The NB 603 is a bridge for connecting the CPU 601, the MEM-P 602, the SB 604, and the ASIC 606. The system memory 602 is used, for example, as a memory for drawing of the multi functional image forming apparatus 501. The SB 604 is a bridge for connecting ROM, peripheral devices, or the PCI bus 609 which are not shown. The MEM-C607 is a memory for buffering code and copy image.

The ASIC 606 is an IC (Integrated Circuit) for the image-processing uses which have a hardware element for image processing. The HDD 608 is storage for performing accumulation of image data, accumulation of document data, accumulation of a program, accumulation of font data, accumulation of form, etc. The operation panel 610 corresponds to the operation part 132 which displays towards an operator while receiving the input operation from the operator. There are a scanner and DRAM including image conversion process, and a plotter in the engine part 650, which connect with the function of the ASIC 606 through the PCI bus 609.

A function of a DMA controller which transmits image is one of the functions of the ASIC 606. The ASIC 606 has a video input DMA controller and a video output DMA controller. When transmitting the image which the scanner reads to the MEM-C607, the IMH 541 secures the memory for transmission image size in the MEM-C 607 according to the process demand which came from the SRM 539, and transmission is enable by setting the address of the secured memory and the transmission image sizes Xw and Yw to the video input DMA controller.

Figure 7:
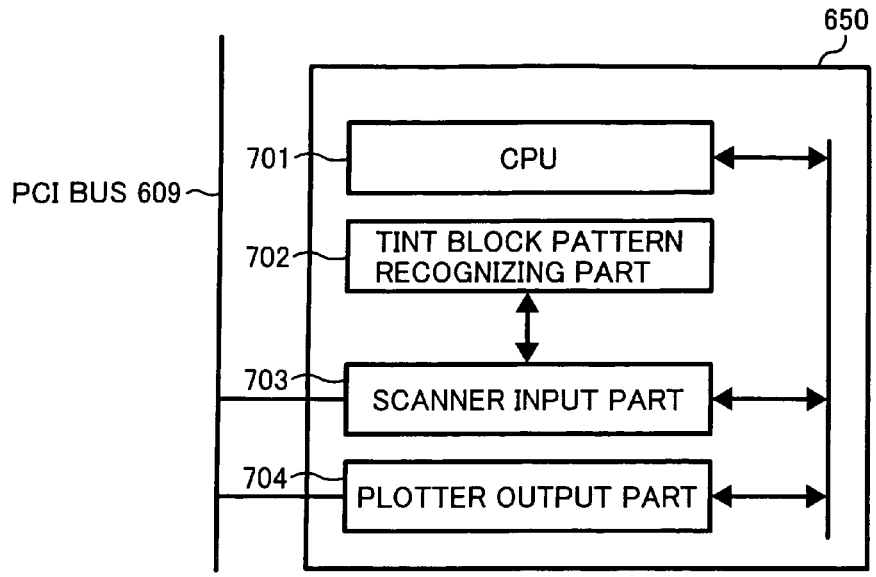
FIG. 7 is an illustration illustrating an example configuration of an engine part of the multi functional image forming apparatus of FIG. 5, including a tint block pattern recognizing part.

FIG. 7 shows a configuration of the unit related to recognizing a certain tint block pattern in the engine part of the example embodiment of the present invention. In FIG. 7, the engine part 650 includes a CPU 701, a tint block pattern recognizing part 702, a scanner input part 703, and a plotter output part 704.

The scanner input part 703 sends the binary image data of the read manuscript image to the tint block pattern recognizing part 702. The tint block pattern recognizing part 702 performs tint block pattern recognition of the image data sent from the scanner input part 703. The tint block pattern recognizing part 702 sends a tint block pattern detection result to the scanner input part 703. The scanner input part 703 fixes the image data in a predetermined gradation and a predetermined phase according to the tint block pattern detection result sent from the tint block pattern recognizing part 702 and directions of CPU 701, and the image data is converted so that the manuscript image is unreadable. The plotter output part 704 outputs the image data for outputting.

Figure 8:
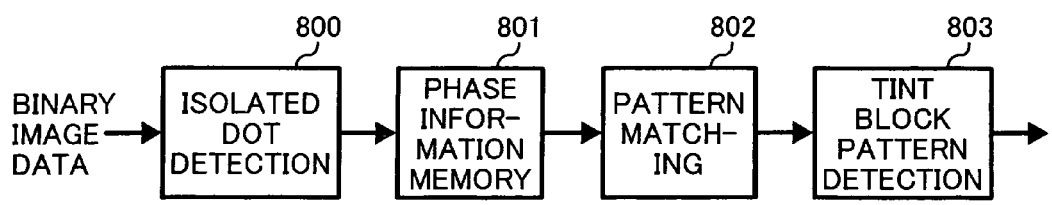
FIG. 8 is a block diagram of an example functional configuration of the tint block pattern recognizing part illustrated in FIG. 7.

FIG. 8 shows a block diagram of a functional configuration of the tint block pattern recognizing part of the example embodiment of the present invention. The tint block pattern recognizing part 702 includes an isolated dot detection part 800, a phase information memory part 801, a pattern matching part 802, and a tint block pattern detection part 803.

Figure 9:
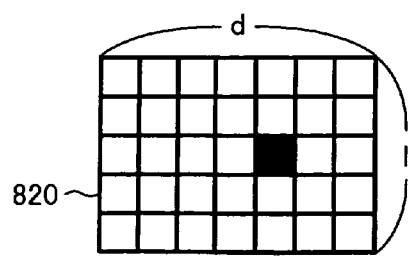
FIG. 9 is an illustration of an example of isolated pixel information.
Figure 10:
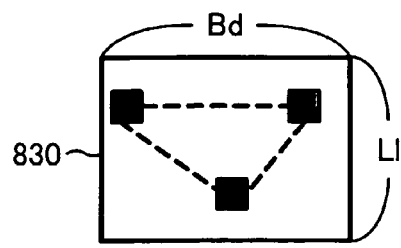
FIG. 10 is an illustration of an example of physical relationship information of isolated pixels.
Figure 11:
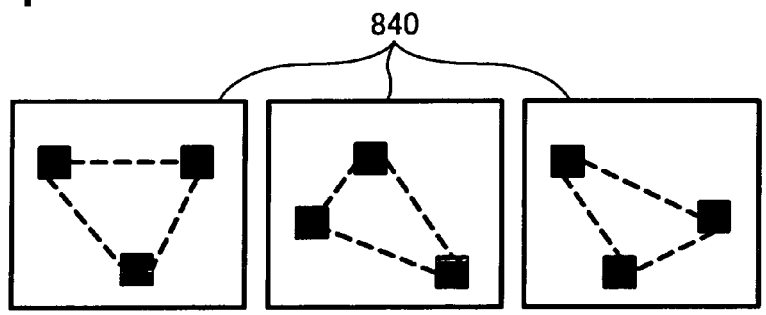
FIG. 11 is an illustration of examples of a certain tint block pattern in a case of pattern matching.

FIG. 9 shows an illustration of example of the isolated pixel information of the example embodiment of the present invention. Isolated pixel information 820 includes the isolated pixel in an area which has d pixels in the main scanning direction and l lines in the sub scanning direction. FIG. 10 shows an illustration of example of the physical relationship information of the isolated pixels of the example embodiment of the present invention. The physical relationship information of the isolated pixels of the example embodiment of the present invention 830 includes the isolated pixels information 820, for example, information about the physical relationship of the isolated pixels in a block which has Bd pixels in the main scanning direction and L1 lines in the sub scanning direction. FIG. 11 shows an illustration of example of a certain tint block pattern in a case of pattern matching of the example embodiment of the present invention. Pattern matching is performed by comparing with the tint block pattern 840 and the physical relationship information 830 of the isolated pixel.

The isolated dot detection part 800 receives binary image data from the scanner input part 703. The isolated dot detection part 800 detects the isolated pixel in an area which has d pixels in the main scanning direction and L1 lines in the sub scanning direction, and outputs the isolated pixel information 820 to the phase information memory part 801 with image data. The phase information memory part 801 memorizes the physical relationship of the isolated pixels in the block which has Bd pixels in the main scanning direction and L1 lines in the sub scanning direction from the isolated pixel information 820 in the area which has d pixels in the main scanning direction and L1 lines in the sub scanning direction, and outputs the physical relationship information 830 of the isolated pixels to the pattern matching part 802. The pattern matching part 802 performs pattern matching with the physical relationship information 830 of the isolated pixels in the block (Bd×L1) memorized in the phase information memory part 801 and the certain tint block pattern 840. For example, the certain tint block pattern 840 may be a certain tint block pattern printed on a bill, a stock certificate, confidential documents, etc., and may be a configuration capable of setting or adding previously by a user. And the pattern matching part 802 outputs the result of pattern matching to the tint block pattern detection part 803. The tint block pattern detection part 803 has a configuration of outputting a detection signal when it recognizes the tint block pattern by n times of certain pattern matching detection in the line of sub scanning. In addition, the resolution more than predetermined is required for the isolated dot detection part 800 and the pattern matching part 802 at the time of manuscript reading. The resolution of manuscript image data becomes lower than predetermined because it becomes impossible to detect the tint block pattern by interference of pixels.

Figure 12:
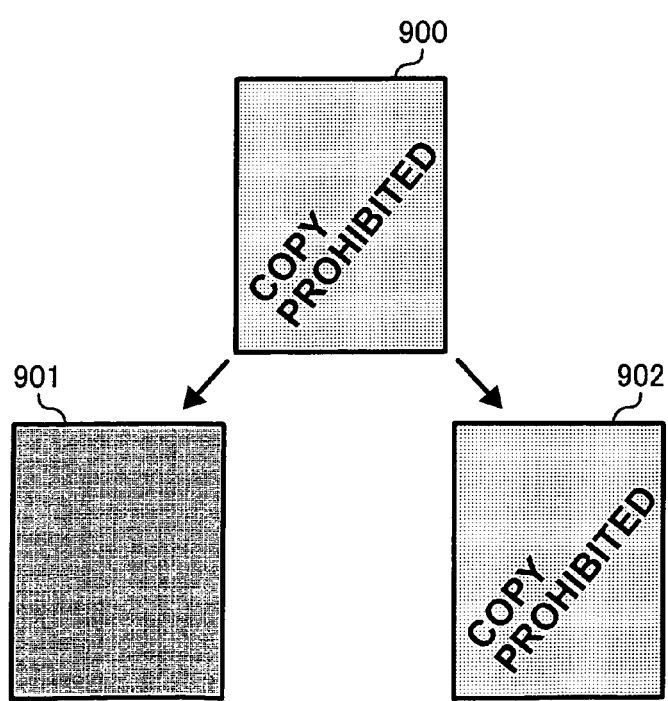
FIG. 12 is an illustration illustrating example resultant images after reading of a copy-prohibited manuscript with or without recognition of copy-prohibition.

FIG. 12 shows an example of the image after manuscript reading of the copy prohibited manuscript. After tint block pattern recognition, if a copy prohibited manuscript 900 with which the tint block pattern is printed is read and the tint block pattern is recognized by the tint block pattern recognizing part 702, the engine part 650 processes and outputs image 901 according to directions of CPU 701 so that the manuscript image is unreadable. For example, the processing resulting in the unreadable image may be image elimination or smeared away processing.

Figure 13:
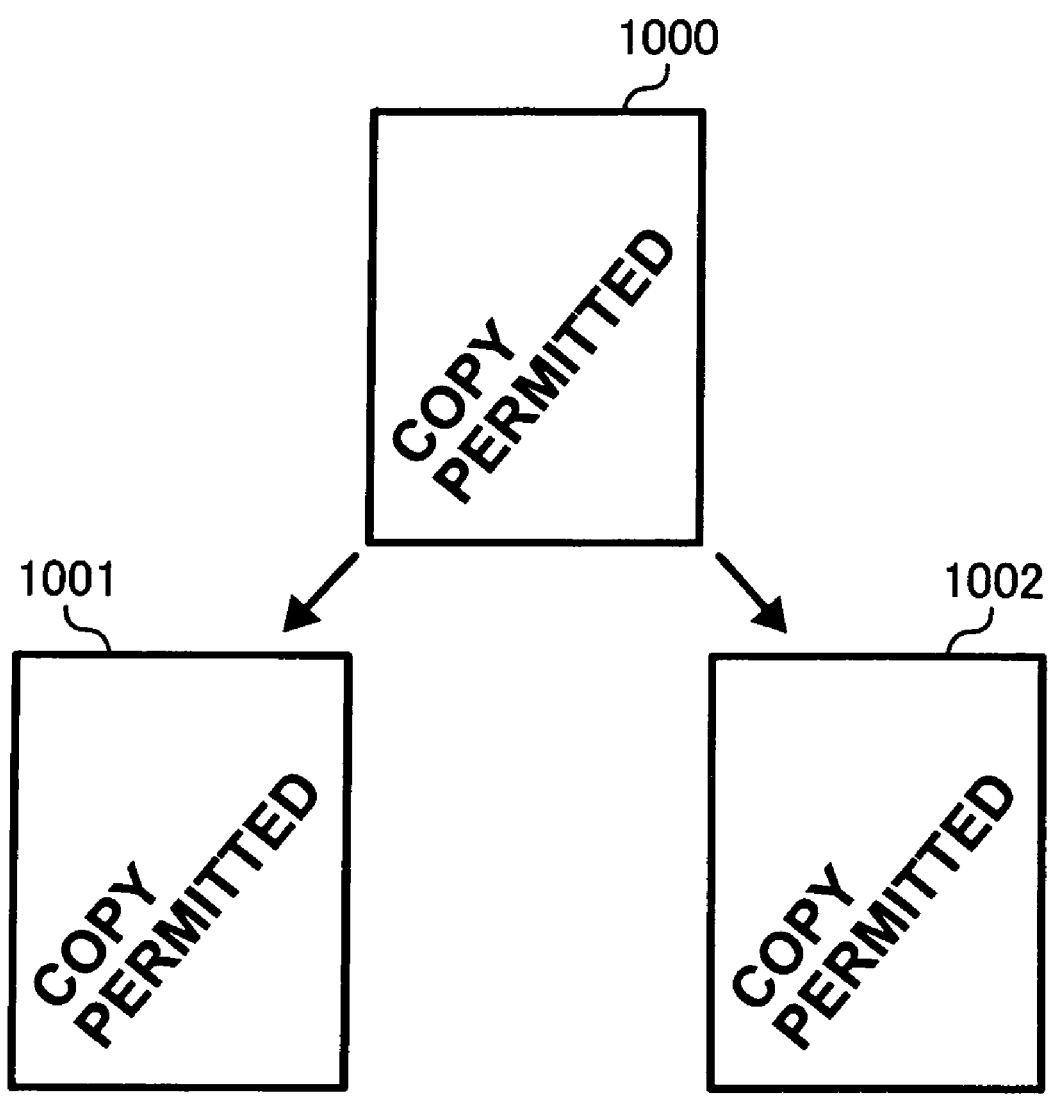
FIG. 13 is an illustration illustrating example resultant images after reading of a copy permitted manuscript with or without recognition of copy-prohibition.

FIG. 13 shows an example of the image after manuscript reading of the copy permitted manuscript. After tint block pattern recognition, even if a copy permitted manuscript 1000 with which the tint block pattern is not printed is read, since a tint block pattern is not recognized by the tint block pattern recognizing part 702, the manuscript is read as it is, and image 1001 is output. Further, even if a copy permitted manuscript 1000 with which the tint block pattern is not printed is read without tint block pattern recognition, the manuscript is read as it is, and image 1002 is output.

Figure 14:
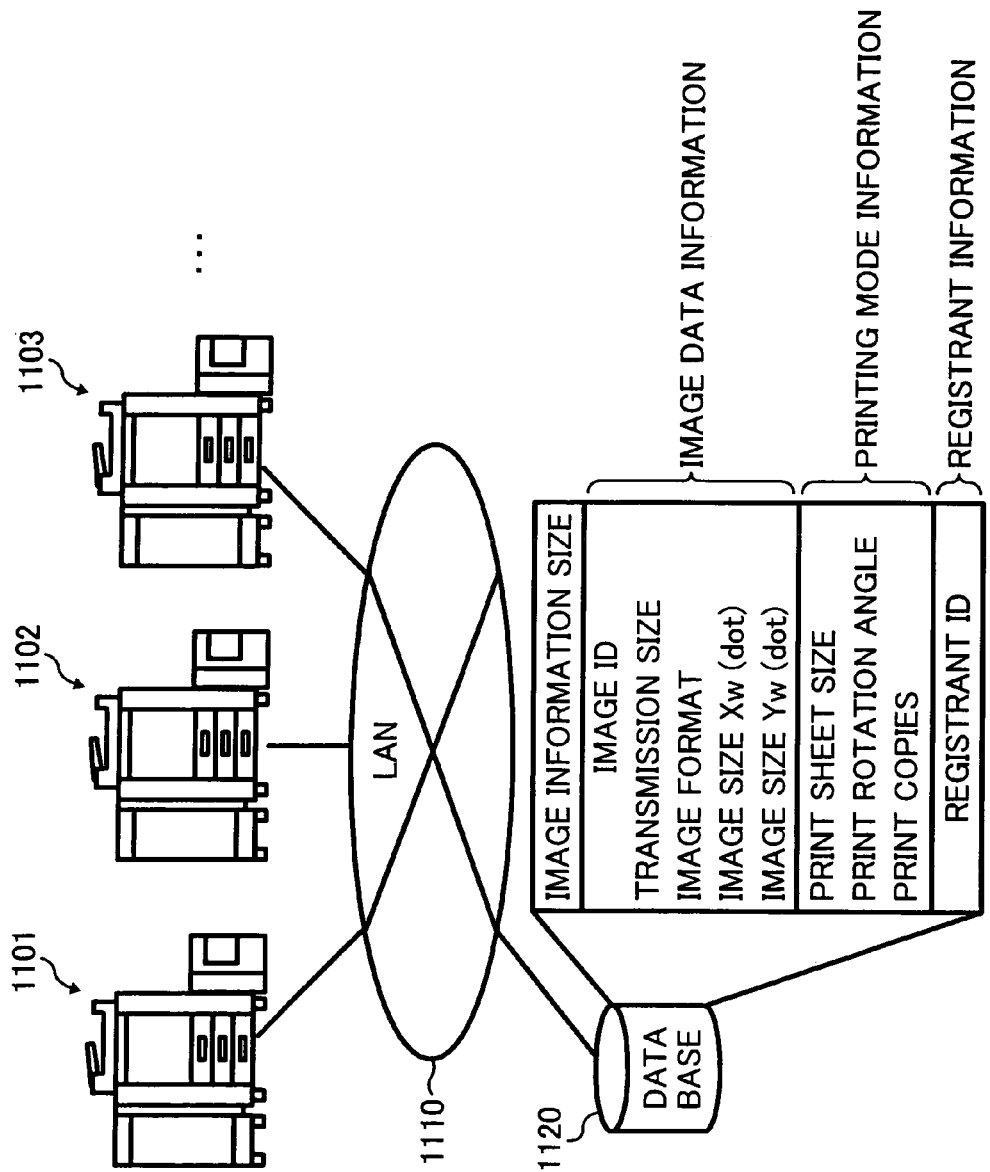
FIG. 14 is a general illustration illustrating an example system of registering a registrant ID to a certain tint block pattern with an image forming apparatus, according to another embodiment of the present invention.

A system registering a registrant's registrant ID (IDentifier) into a certain tint block pattern is described using FIG. 14. FIG. 14 is a general illustration showing the system of registering Registrant ID to the certain tint block pattern with an image forming apparatus. In FIG. 11, the image forming apparatuses 1101-1103 are connected with a database 1120 through LAN (Local Area Network) 1110.

The image forming apparatuses 1101-1103 has the function relative to the above-mentioned engine part 650. The image forming apparatus may be connected to the LAN 1110, or the plural image forming apparatuses may be connected to the LAN 1110 as of its configuration. Through the LAN 1110, communication between the database 1120 and the image forming apparatuses 1101-1103 is possible. The database 1120 includes image information size, image data information, printing mode information, and registrant information. And in the case where the tint block pattern is output, the Registrant ID is input from the operation panel 610. Registrant information and image information (image data information, printing mode information) are registered into the database 1120 after reading the manuscript. For example, the image data information includes an image ID (IDentifier) which makes the image unique, a transmission size of image data, an image format, information containing image size, etc. The printing mode information includes print sheet size, a printing rotation angle, information containing print copies etc. The image information size includes information about a total size of the image data information and the printing mode information. The registrant information includes the registrant ID which determines a registrant uniquely, and which can be input from the operation panel 610. Although this example is configured connecting the database 1120 outside the image forming apparatuses 1101-1103 as shown in this figure, the image forming apparatuses 1101-1103 may have the function of the database 1120. Moreover, instead of inputting Registrant ID in the case of the output of the tint block pattern, it may be configured to register the certain tint block pattern related to the copy prohibited manuscript beforehand, and to register an administrator's ID related with the certain tint block pattern.

Figure 15:
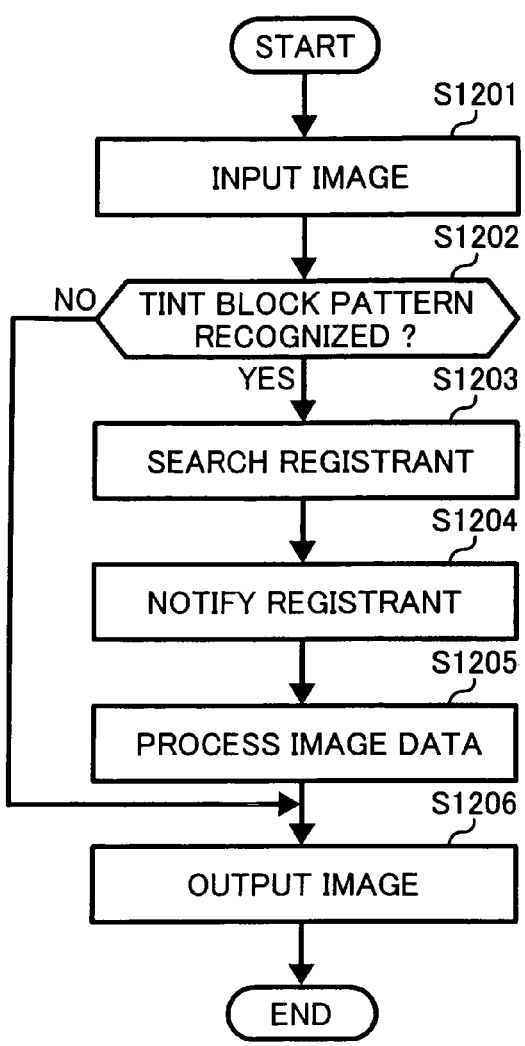
FIG. 15 is a flowchart of an example procedure of a registration operation performed by the system of FIG. 14.

FIG. 15 shows a flowchart showing the details of processing of the image forming apparatus of the example embodiment of the present invention. In the flowchart of FIG. 15, first, image data is input from the scanner input part 703 (S1201). Then it is determined whether a tint block pattern is recognized by the tint block pattern recognizing part 702 (S1202).

In Step S1202, when a tint block pattern is recognized (S1202: Yes), registrant information registered into the database 1120 is searched (S1203), and the registrant is notified (S1204). Then, image data is processed by the tint block pattern recognizing part 702 (S1205), and the image is output (S1206).

In Step S1202, when a tint block pattern is not recognized (S1202: No), the image is output as it is and without the steps of searching, notifying and processing (S1206), According to the example embodiment of the present invention, only when a tint block pattern is recognized, are the steps of outputting image processed from the manuscript and notifying a registrant prevent unauthorized copy performed so that a tint block pattern registrant can check whether the unauthorized copy has been performed.

Another example embodiment of the present invention is described next. An image forming apparatus of this example embodiment of the present invention can prevent an unauthorized printing result in addition to notifying a registrant by e-mail as in the previous embodiment of the present invention.

Figure 16:
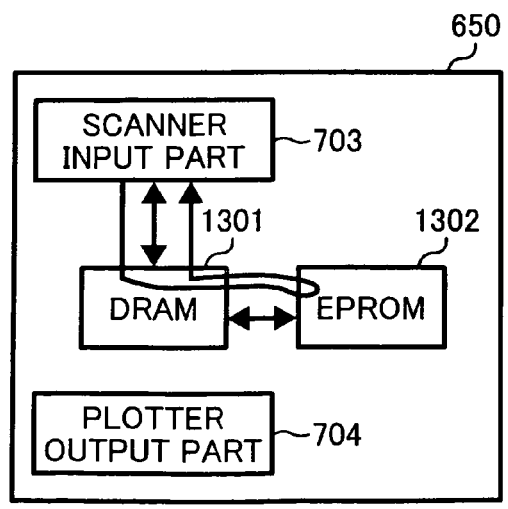
FIG. 16 is a block diagram of an example functional configuration of the engine part illustrated in FIG. 6.

FIG. 16 is an illustration showing the functional configuration of the engine part which saves the unauthorized printing result related to the embodiment of the present invention. When image input processing is performed in the scanner input part 703 and the tint block pattern is recognized, after notifying a registrant and processing the image, an unauthorized printing result is recorded on EPROM (Erasable Programmable Read Only Memory) 1302 in the engine part 650 through DRAM 1301, and image output processing is performed. The unauthorized printing result recorded on EPROM 1302 may be checked by the third person who is not a user when processing the unauthorized printing is performed. For example, the unauthorized printing result may include information that the unauthorized printing is performed, information about the recognized tint block pattern, etc.

Figure 17:
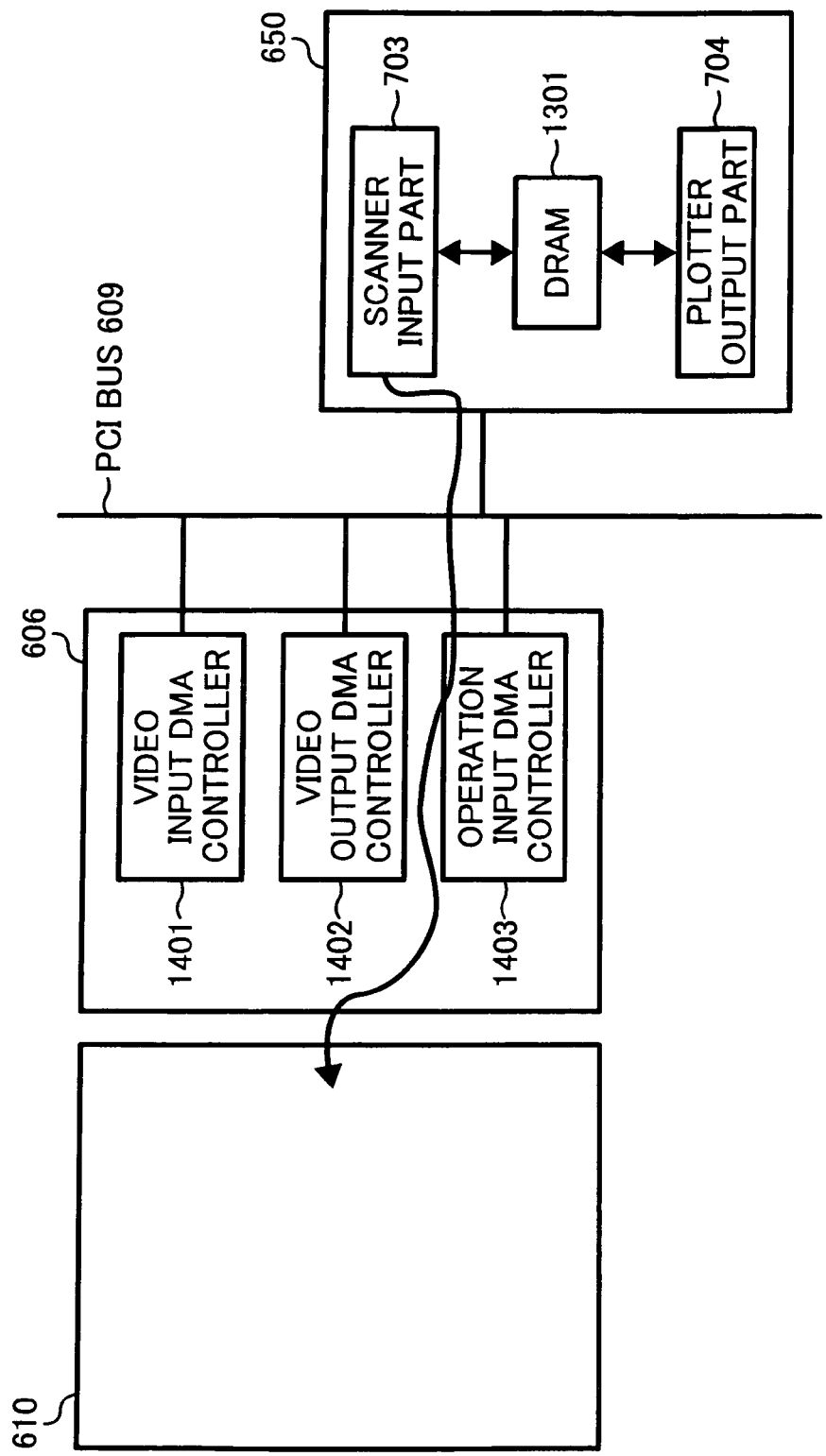
FIG. 17 is a block diagram of an example functional configuration of displaying an unauthorized printing result on an operation panel illustrated in FIG. 6.

The example which displays the above-mentioned unauthorized printing result on the operation panel 610 is described next. FIG. 17 is a block diagram showing the functional configuration of displaying the unauthorized printing result on the operation panel 610 of the embodiment of the present invention.

In FIG. 17, the engine part 650 includes the plotter output part 704, the DRAM 1301, the scanner input part 703, it connects with the function of the ASIC 606 through the PCI bus 609. The ASIC 606 has a function as DMA controller which transmits image, and a function as the DMA controller which transmits the unauthorized printing result. The ASIC 606 includes a video input DMA controller 1401, a video output DMA controller 1402, and an operation input DMA controller 1403.

When image input processing is performed and a tint block pattern is recognized in the scanner input part 703, or when the unauthorized printing result is transmitted to the operation panel 610, after notifying the registrant and processing the image, the unauthorized printing result is acquired. And transmission becomes possible by setting the information which displays the unauthorized printing result on the operation panel 610 to the operation input DMA controller 1403. As the operation panel 610 displays the unauthorized printing result, the user can check the unauthorized printing result when processing of the unauthorized printing is performed.

Figure 18:
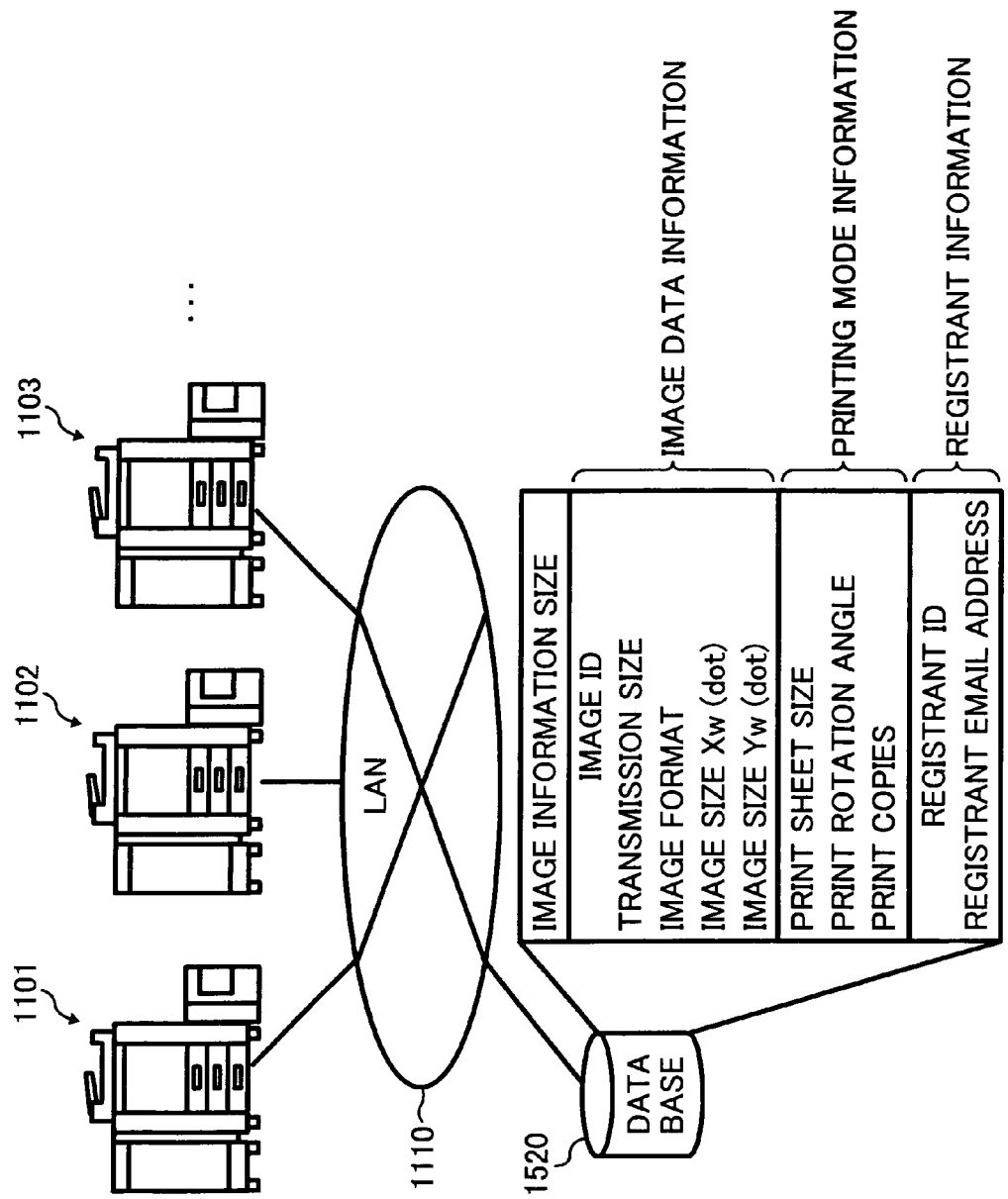
FIG. 18 is a general illustration illustrating an example system of registering a registrant ID and a registrant e-mail address to a certain tint block pattern with an image forming apparatus, according to another embodiment of the present invention.

Next, the system which registers a registrant's Registrant ID and registrant e-mail address into a certain tint block pattern is described using FIG. 18. FIG. 18 is a general illustration showing the system of registering Registrant ID and the registrant e-mail address to the certain tint block pattern with an image forming apparatus. In FIG. 18, the image forming apparatuses 1101-1103 are connected with a database 1520 through LAN (Local Area Network) 1110. The description of FIG. 14 is applicable to FIG. 18.

Through the LAN 1110, communication between the database 1520 and the image forming apparatuses 1101-1103 is possible, and the database 1520 includes image information size, image data information, printing mode information, and registrant information. And in case the tint block pattern is output, the Registrant ID and the registrant e-mail address are input from the operation panel 610. Registrant information and image information (image data information, printing mode information) are registered into the database 1520 after reading the manuscript. In addition to the Registrant ID, the registrant e-mail address is also registered as registrant information.

Figure 19:
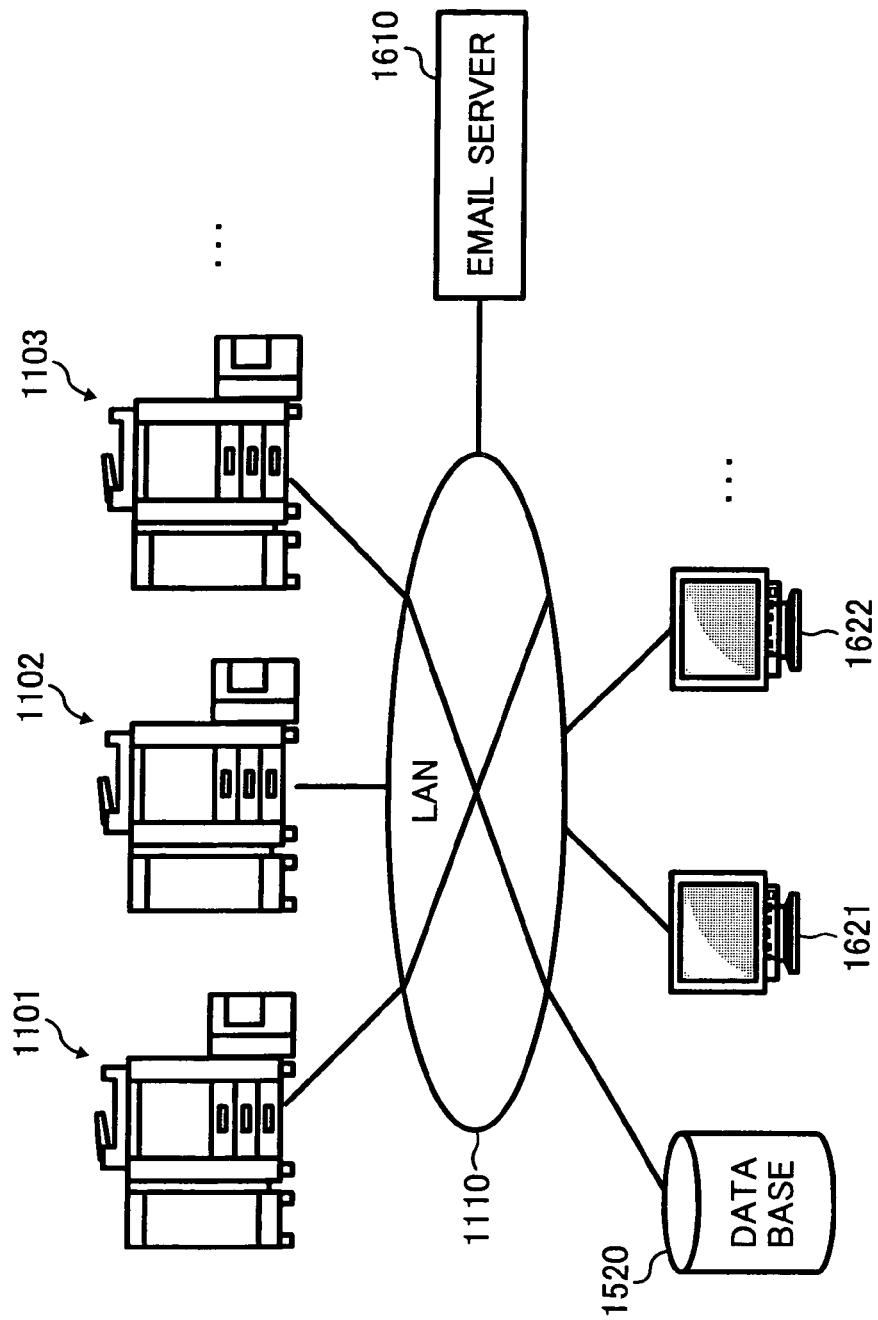
FIG. 19 is an illustration illustrating an example general configuration of a system which notifies an unauthorized printing result by e-mail, according to another embodiment of the present invention.

FIG. 19 is an illustration showing the general configuration of the system which notifies an unauthorized printing result by E-mail. The description of FIG. 18 is applicable to FIG. 19.

Image forming apparatuses 1101-1103, a database 1520, an e-mail server 1610, a PC 1621 and a PC 1622 are connected through LAN 1110 so that communication is possible.

The e-mail server 1610 manages transmission and reception of e-mail. The mage forming apparatuses 1101-1103, the e-mail server 1610, and the PCs (personal computer) 1621 and 1622 transmit and receive e-mail by the present communications protocol, SMTP (Simple Mail Transfer Protocol) and POP (Post Office Protocol) in here. For example, PCs 1621 and 1622 may be possessed by the registrant, or may be managed by an administrator.

Figure 20:
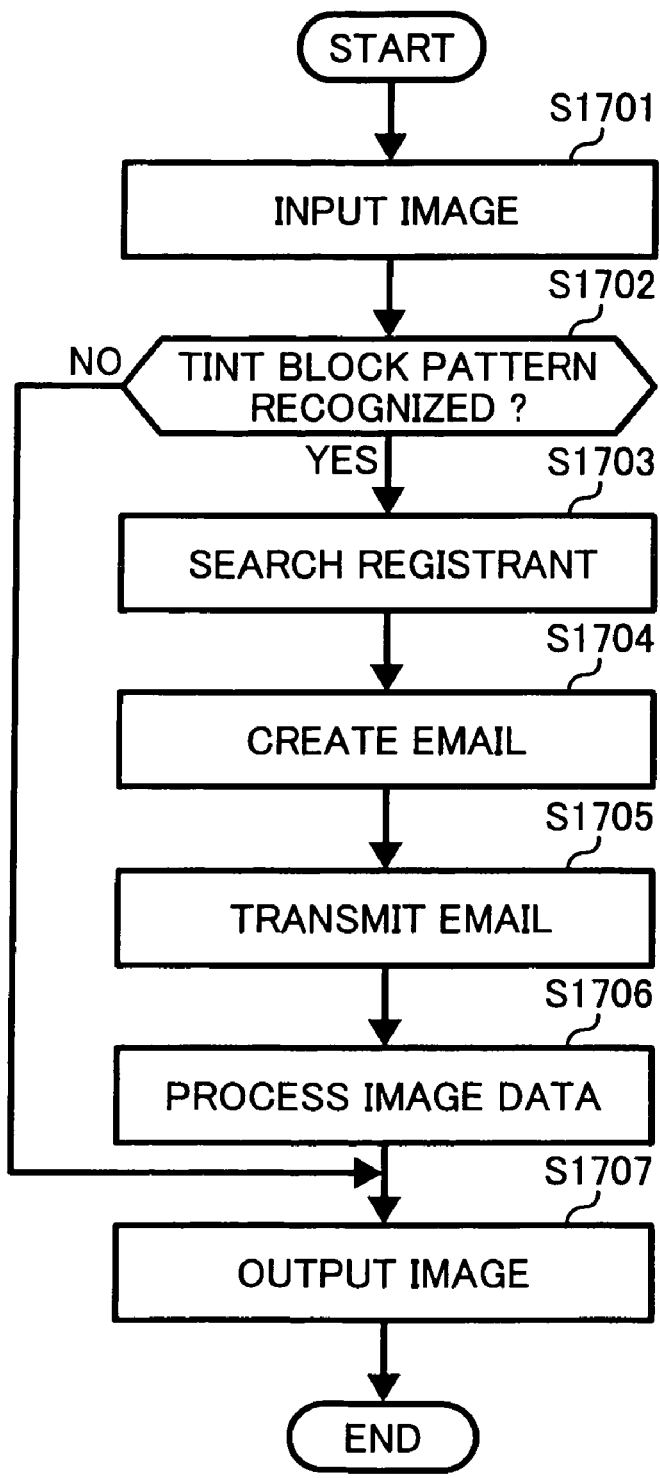
FIG. 20 is a flowchart of an example procedure of a registration operation performed by the system of FIG. 16.

FIG. 20 is a flowchart showing the contents of processing of the image forming apparatus related to the embodiment of the present invention. In the flowchart of FIG. 20, first, image data is input from the scanner input part 703 (S1701). And it is judged whether a tint block pattern is recognized by the tint block pattern recognizing part 702 (S1702).

In Step S1702, when a tint block pattern is recognized (S1702: Yes), a registrant registered into the database 1520 is searched (S1703). And e-mail including the unauthorized printing result is created (SI 704), and the e-mail is transmitted to the PC 1621 and PC 1622 (S1705). The transmission of this e-mail follows the procedure specified by SMTP.

Then, image data is processed by the tint block pattern recognizing part 702 (S1706), and image is output (S1707).

In Step S1702, when a tint block pattern is not recognized (S1702: No), image is output as it is (S1707), According to the embodiment of the present invention, the unauthorized printing result can be checked by seeing the e-mail, and the result can also be saved in the outside of the image forming apparatus. Further, even if it does not check directly with the image forming apparatus, it can be checked with PC which a registrant or an administrator owns. Furthermore, when printing and outputting image is performed without knowing unauthorized printing, a user is not confused, because the unauthorized printing result can be displayed on the operation panel.

Another example embodiment of the present invention is described next. An image forming apparatus of this example embodiment of the present invention has a configuration which can select notifying or saving an unauthorized printing result as in first embodiment of the present invention.

Figure 21:
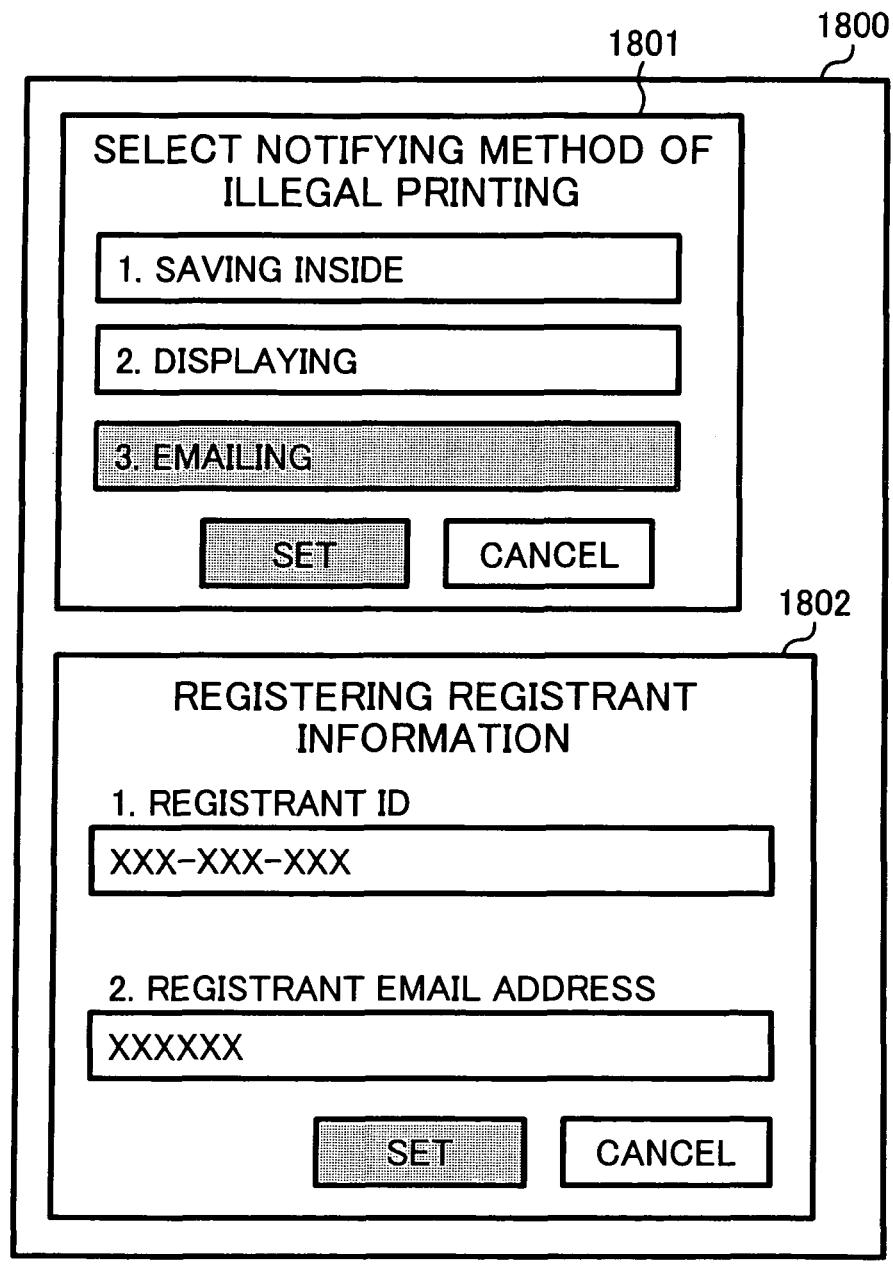
FIG. 21 is an illustration illustrating an example of a display of an operation panel which chooses notifying method of the unauthorized printing result according to another embodiment of the present invention.

FIG. 21 is an illustration showing an example of a display of an operation panel which chooses notifying method of the unauthorized printing result according to the embodiment of the present invention. If the image forming apparatuses 1101-1103 according to the embodiment of the present invention outputs a tint block pattern, it can select notifying method of an unauthorized printing result from the operation panel 610. A displaying example 1800 on the operation panel 610 has a selecting screen of the notifying method of the unauthorized printing result 1801, and a registering screen of the registrant information 1802. On the selecting screen of the notifying method of the unauthorized printing result 1801, when 1) saving in the image forming apparatus and 2) displaying on the operation panel are chosen, only one registrant ID is registered on the registering screen of the registrant information 1802. Further, on the selecting screen of the notifying method of the unauthorized printing result 1801, when 3) notifying by e-mail is chosen, registrant ID and registrant e-mail address are registered on the registering screen of the registrant information 1802.

Figure 22:
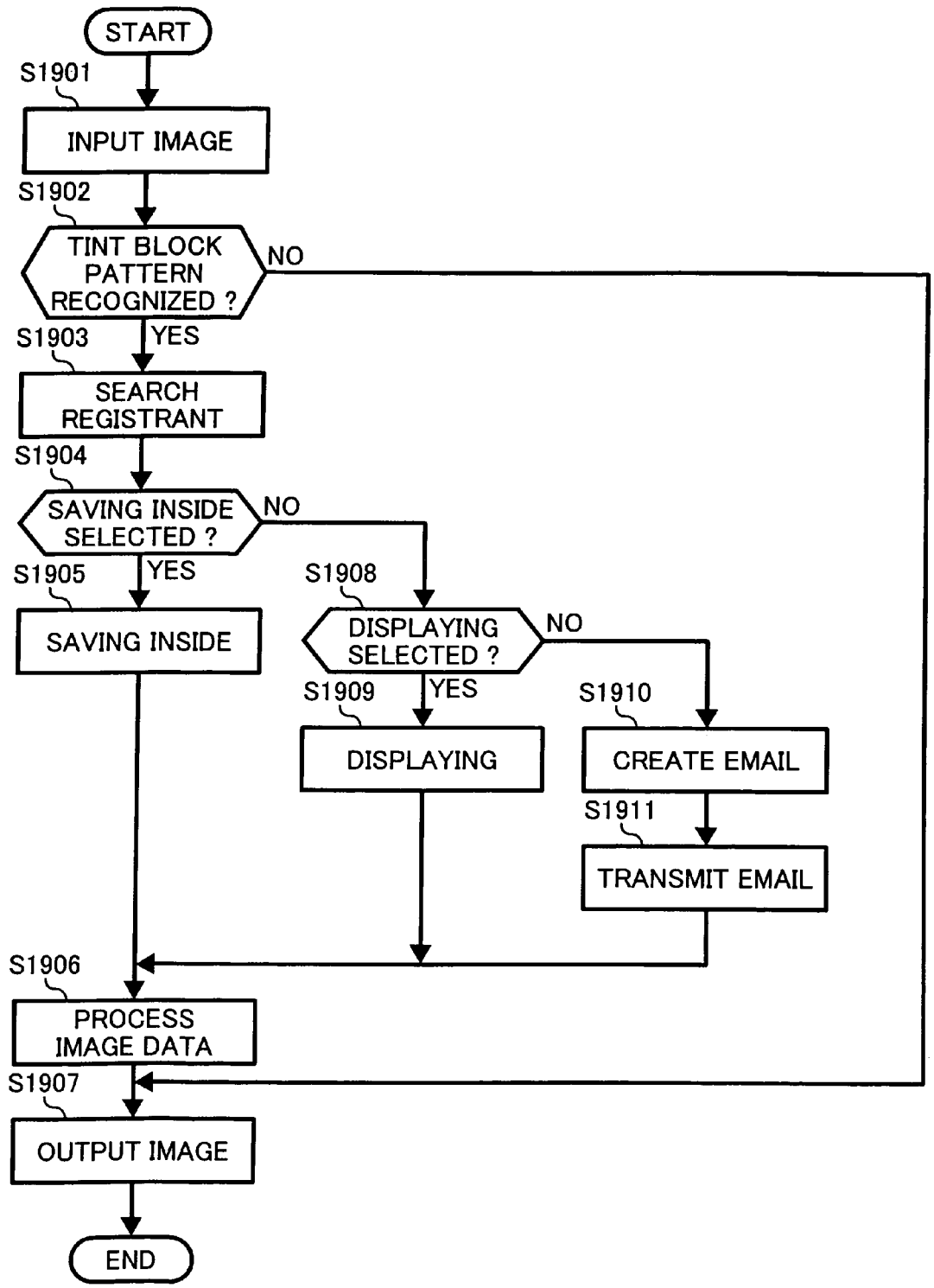
FIG. 22 is a flowchart of an example procedure of the image forming apparatus of the example embodiment of FIG. 21.

FIG. 22 shows a flowchart showing the details of processing of the image forming apparatus of the example embodiment of the present invention. In the flowchart of FIG. 22, first, image data is input from the scanner input part 703 (S1901). And it is judged whether a tint block pattern is recognized by the tint block pattern recognizing part 702 (S1902).

In Step S1902, when a tint block pattern is recognized (S1902: Yes), a registrant registered into the database 1520 is searched (S1903), and a notifying method of the unauthorized printing result is judged.

About the notifying method of the unauthorized printing result, when the saving in the image forming apparatus is chosen (S1904: Yes), the unauthorized printing result is saved in the image forming apparatus (S1905). Then, image data is processed by the tint block pattern recognizing part 702 (S1906), and image is output (S1907).

In the step S1904, about the notifying method of the unauthorized printing result, when the saving in the image forming apparatus is not chosen (S1904: No), it is judged whether displaying on the operation panel is chosen (S1908). When displaying on the operation panel is chosen (S1908: Yes), the unauthorized printing result is displayed on the operation panel (S1909). Then, image data is processed by the tint block pattern recognizing part 702 (S1906), and image is output.

In the step S1908, about the notifying method of the unauthorized printing result, when the displaying on the operation panel is not chosen (S1908: No), in order to transmit e-mail, email including the unauthorized printing result is created (S1910), and the e-mail is transmitted to the set email address when a tint block pattern is output (S1911). Then, image data is processed by the tint block pattern recognizing part 702 (S1906), and image is output (S1907).

In Step S1902, when a tint block pattern is not recognized (S1902: No), image is output as it is (S1907).

According to the embodiment of the present invention, depending on the use of the unauthorized printing result, the unauthorized printing result can be used for every image output process.

The image forming method explained with the embodiment can be realized by executing a prepared program with computers, such as a personal computer and a workstation. This program is recorded on a recording medium which can be read by computers, such as a hard disk, a flexible disk, CD-ROM, MO, DVD, etc. and is executed after being read from the recording medium by computer. Further, this program may be a transmission media which can be distributed through networks, such as the Internet.

Also, this invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2005-153086 filed on May 25, 2005 in the Japanese Patent Office, the entire contents of which are incorporated by reference herein.

What is claimed:

1. An image forming apparatus, comprising:
   a defining mechanism configured to set an identifier corresponding to a predetermined pattern and identifying address information of a destination;

a reader configured to read image data of an original of an image;

a detector configured to detect a background pattern in the image data read by the reader;

a comparator configured to compare the background pattern detected by the detector with the predetermined pattern and to produce a comparison result;

a notifier configured to provide information about the comparison result of the comparator according to the identifier; and an image processor configured to convert the image data into unreadable image data when the detected background pattern is identified with the predetermined pattern by the comparator, wherein when the detected background pattern is identified with the predetermined pattern by the comparator, the notifier is further configured to provide notice of an unauthorized processing including information that the detected background pattern is identified with the predetermined pattern by the comparator.

2. The apparatus of claim 1, further comprising:

a memory connected to the notifier and configured to store the notice of unauthorized processing.

3. The apparatus of claim 1, further comprising:

a display connected to the notifier and configured to display the notice of unauthorized processing.

4. The apparatus of claim 1, wherein the address information includes an email address.

5. The apparatus of claim 1, further comprising:

a selector configured to select a specification of the information of unauthorized processing to be output, wherein the notifier outputs the information of unauthorized processing according to the selected specification by the selector.

6. A method for image forming, comprising:

setting an identifier according to a predetermined pattern and identifying address information of a destination;

reading image data of an original of an image;

detecting a background pattern in the image data read by the reader;

comparing the detected background pattern with the predetermined pattern;

notifying information of the result of the step of comparing according to the identifier; and converting the image data into unreadable image data when the detected background pattern is identified with the predetermined pattern, wherein, when the detected background pattern is identified with the predetermined pattern, the notifying step includes providing notice of an unauthorized processing including information that the detected background pattern is identified with the predetermined pattern.

7. A computer readable medium storing a computer program including instructions configured to cause a computer to perform the steps of:

setting an identifier according to a predetermined pattern and identifying address information of a destination;

reading image data of an original of image;

detecting a background pattern in the image data read by the reader;

comparing the background pattern with the predetermined pattern;

notifying information of the result of the step of comparing according to the identifier; and converting the image data into unreadable image data when the detected background pattern is identified with the predetermined pattern, wherein, when the detected background pattern is identified with the predetermined pattern, the notifying step includes providing notice of an unauthorized processing including information that the detected background pattern is identified with the predetermined pattern.

8. An image forming apparatus, comprising:

means for setting an identifier according to a predetermined pattern and identifying address information of a destination;

means for reading image data according to an original of image;

means for detecting a background pattern in the image data read by the reader;

means for comparing the detected background pattern with the predetermined pattern to produce a comparison result;

means for notifying the result of the comparison according to the identifier; and means for converting the image data into unreadable image data when the detected background pattern is identified with the predetermined pattern by the means for comparing, wherein when the detected background pattern is identified with the predetermined pattern by the means for comparing, the means for notifying is further configured to provide notice of an unauthorized processing including information that the detected background pattern is identified with the predetermined pattern by the means for comparing.

* * * * *